May 1, 1951  C. J. BLOM  2,550,667
SEAL STRUCTURE
Original Filed Aug. 1, 1944

CARL J. BLOM,
INVENTOR

BY Lyon Lyon

ATTORNEYS.

Patented May 1, 1951

2,550,667

UNITED STATES PATENT OFFICE 2,550,667

SEAL STRUCTURE

Carl J. Blom, San Marino, Calif., assignor to Byron Jackson Co., Vernon, Calif., a corporation of Delaware Original application August 1, 1944, Serial No. 547,617, now Patent No. 2,404,783, dated July 30, 1946. Divided and this application June 11, 1946, Serial No. 675,984

3 Claims. (Cl. 286—11.15)

This application is a division of my copending application Serial No. 547,617, filed August 1, 1944, now Patent No. 2,404,783, issued July 30, 1946, for Submersible Motor.

This invention relates generally to seal structures for effecting a fluid-tight seal between relatively rotatable parts, and is directed particularly to improvements in sealing devices of the type generally referred to as mechanical seals, wherein two walls of a chamber are sealed from the exterior. The seal for each wall comprises at least one pair of relatively rotatable sealing elements, usually in the form of plates or discs, having cooperating surfaces disposed in a radial plane which interengage to effect a seal. The stationary sealing element is mounted on a fixed element, such as the wall of a housing or partition, in concentric relation to a shaft opening, and the rotating sealing element is mounted on a shaft or other rotatable member.

It is customary to mount the rotating sealing element on the shaft for limited axial movement relative thereto and to provide means for yieldingly urging the rotatable sealing element toward the stationary sealing element, to force the sealing faces thereof into pressure engagement and to provide take-up to compensate for wear of the faces. In those applications of this type of sealing device in which the fluid pressure differential across the seal tends to force the sealing faces together, it is unnecessary to provide other means for retaining the stationary sealing element on its seat. If, however, the pressure differential acts in a direction tending to separate the sealing faces, the stationary sealing element may be forced away from its seat by fluid pressure unless special provision is made for retaining it. Moreover, in the double sealing of two walls of a sealed chamber by these type seals, it is frequently preferred that one of the two seals admit exterior fluid into the chamber more readily than the other, as is the case often in motor pump units wherein a sealed chamber exists having on its one side the dielectric fluid of the motor and on its other side the exterior pump fluid.

It is a principal object of this invention to provide a mechanical seal structure wherein one of two sealing structures for a chamber or other walled enclosure admits fluid into the chamber under a lesser pressure differential across said structure than does the other sealing structure.

A more specific object of this invention is to provide a double mechanical seal structure for a seal chamber for a motor pump shaft where said seal chamber is interposed between the motor chamber itself and the pump exterior, wherein it is desired that dielectric fluid from the motor chamber pass into said seal chamber more readily than can the pump fluid pass into the said seal chamber.

Yet another object of this invention is to provide a structure wherein the effective pressure areas of the particular seal which more readily admit exterior fluid cause fluid pressure to retain the stationary sealing element of such seal on its seat.

With the above and other objects in view as may appear hereinafter, reference is directed to the accompanying drawing, in which.

Generally speaking, the instant invention comprises a double mechanical seal including two stationary sealing elements each mounted in one wall of a sealed chamber, and two rotatable sealing elements each mounted on the shaft passing through the sealed chamber and each cooperating with one of the stationary sealing elements to form two seal units, the elements of one of the sealing units providing relative pressure areas such that the fluid exteriorly of said seal unit is admitted more readily to the sealed chamber than is the fluid exteriorly of the other seal unit. At the same time said relative pressure areas act to retain the stationary sealing element of the first seal unit against its seat.

Figure 1:
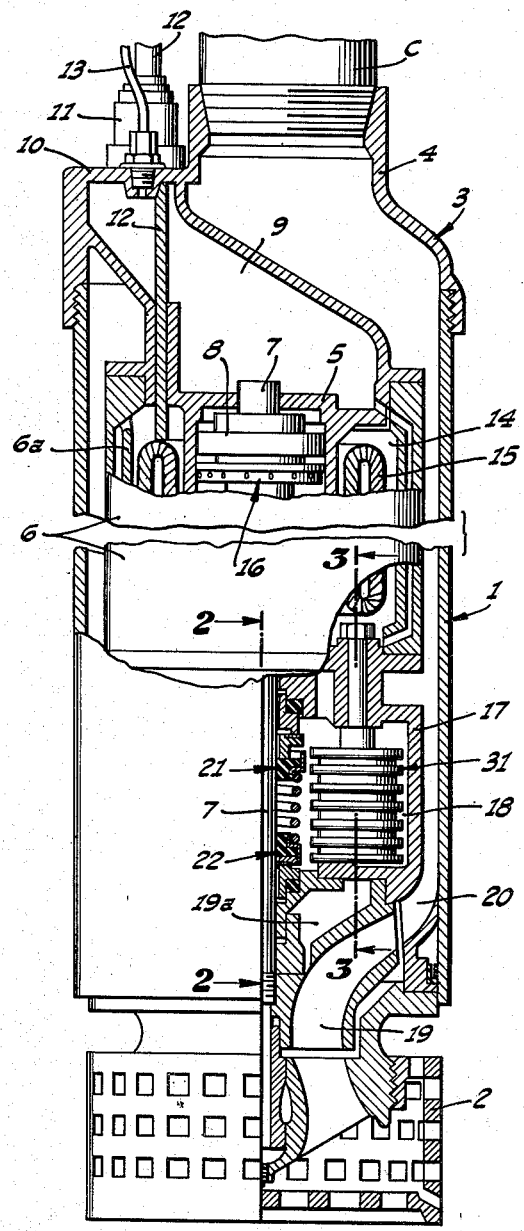
Fig. 1 is a view, partly in elevation and partly in longitudinal section, of a motorpump unit embodying the novel sealing device of this invention.

In Fig. 1 there is shown a submersible motorpump unit as illustrative of a typical application of the novel mechanical seal device. An outer shell 1 is fitted at its lower end with a pump intake structure 2 and is connected at its upper end to a head structure 3. The head structure includes a reducer fitting 4 for connection to a casing or pipe C. The head structure also includes a motor head 5 located within the reducer fitting and adapted to suspend a motor case 6 within the outer shell 1. The motor head 5 journals a shaft 7 by an upper bearing 8. Above the upper bearing the motor head 5 forms an upper protective fluid chamber 9 isolated from the reducer fitting or shell 4. The protective fluid may be any fluid having, primarily, dielectric properties sufficient to prevent shorting of the motor windings; it may also have lubrication properties. Various oils, or oil-like fluids similar to "transformer" oil have been found suitable. Hence, for convenience, the protective fluid may be hereinafter referred to as "oil."

The upper end of the oil chamber 9 forms a shelf 10 located at one side of the smaller end of the reducer fitting. A terminal element 11 forming the end of a conductor cable 12 is fastened into the shelf 10 so that the conductor may be brought into the oil chamber and through the motor case 6. An oil line 13 which may be incorporated in the conductor cable or constitute a separate line, is provided with a fitting for attachment to the shelf 10 so that the oil line communicates with the interior of the upper oil chamber 9.

A motor chamber 14 is provided within the motor case 6, and the elements of an electric motor including the field coils 15 and the armature (not shown) are arranged therein. An oil circulating pump 16 may be provided on the shaft 7 for the purpose of circulating oil in one direction through the motor chamber, and in the opposite direction through oil jacket 6a incorporated in the motor case 6.

The lower end of the motor case 6 is closed by a seal chamber housing 17 which defines a seal chamber 18. The shaft 7 extends through the seal chamber and its protruding end is provided with a pump rotor 19 which draws fluid from the pump intake 2 and discharges it into a fluid passage 20 formed between the seal chamber housing 17, motor case 6, and outer shell 1.

It is preferred to arrange the pump rotor 19 in such a manner that a low pressure chamber 19a is provided between the pump rotor and the under side of the seal chamber housing 17.

Figure 2:
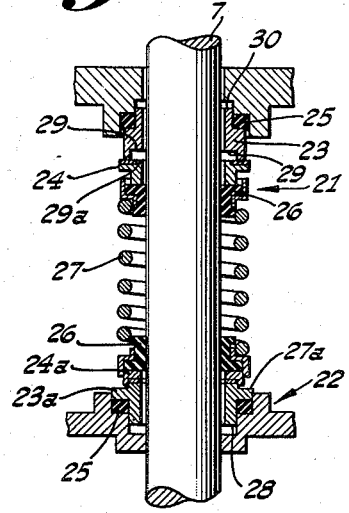
Fig. 2 is an enlarged fragmentary sectional view through line 2—2 of Fig. 1.

A seal unit 21 is provided around the shaft 7 to isolate the seal chamber from the motor chamber. A similar seal unit 22 is provided around the shaft 7 to isolate the seal chamber from the low pressure chamber 19a and from the pumped fluid. The seal units comprise respectively fixed rings 23 and 23a secured to a wall of the seal chamber and rotating rings 24 and 24a mounted on the shaft 7 within the seal chamber as shown best in Figure 2.

The fixed seal rings 23 and 23a are preferably backed or seated on resilient rings 25 formed of rubber, synthetic rubber, leather or suitable material which are fitted in the wall of the seal chamber. The rotating rings are backed by flexible seal rings 26 of material similar to the resilient rings 25. The resilient rings 25 and the seal rings 26 form the double function of first, sealing the connections between the rings 23 and 23a and seal chamber walls and between the rings 24 and 24a and the shaft 7 respectively; and secondly, permitting limited wobble adjustment of the rings 23 and 24 to effect perfect mating between their confronting sealing surfaces.

A spring 27 is interposed between the seal rings 26 to urge the rotating rings 24 and 24a against their respective fixed rings 23 and 23a. The seal units 21 and 22 are, in effect, check valves which open from the motor chamber 14 and the low pressure chamber 19a respectively, into the seal chamber if the external pressure is high enough to overcome the force of the spring 27 and the pressure of the fluid in the seal chamber against the rings 24.

It is desirable that the upper seal unit 21 open at a lesser pressure differential than the lower one; furthermore, it is desirable that the fixed seal rings 23 and 23a have no special fastening means to hold them in place, but instead be held against their respective resilient rings 25 by fluid pressure. Both of these objectives are accomplished in the arrangement shown in Fig. 2.

The fixed seal ring 23a of the lower seal unit 22 is provided with a flange exposed to the seal chamber and which constitutes a pressure face 27a. The pressure face 27a is equal to or greater than the lower end 28 of the lower fixed seal ring 23a; consequently, pressure in the seal chamber urges this ring against its seat. The bore of the lower fixed seal ring 23a is substantially the same as its mating rotating ring so that there is no appreciable pressure area subject to pressure in the chamber 19a and effective to raise the rotating ring.

One of the confronting sealing surfaces of the fixed or rotating ring of the upper seal unit 21 is undercut adjacent the shaft 7 to form confronting pressure faces 29 and 29a. The effective area of these pressure faces exceeds the area of the upper end 30 of the upper fixed seal ring 23 so that the pressure in the motor chamber 14 urges the upper fixed seal ring 23 into its seat. Furthermore, the pressure in the motor chamber is effective against the pressure face 29a of the rotating ring to urge this ring downwardly against the spring 27.

Figure 3:
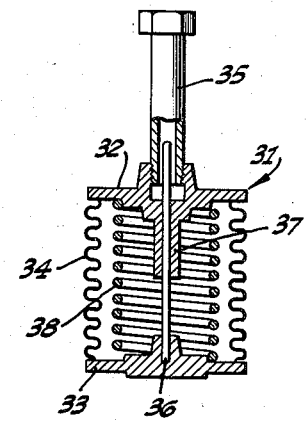
Fig. 3 is an enlarged fragmentary sectional view through line 3—3 of Fig. 1.

A pressure equalizing bellows 31 is provided in the seal chamber 18. As shown best in Fig. 3, the bellows 31 comprises a circular head member or plate 32, and a circular foot member or disc 33 connected by an annularly corrugated bellows shell 34. The head member 32 is suitably secured to a wall of the seal chamber housing 17 preferably at the upper wall, by means of a hollow bolt 35 which extends through the upper wall of the seal chamber housing into the motor chamber 14, so that oil or other dielectric liquid from the motor chamber may enter the bellows. The foot member 33 is provided with a stem 36 which is guided by a sleeve 37 depending from the head member 32. A spring 38 tends to expand the bellows so that normally the bellows occupies an extended position as shown in Fig. 3.

It will be apparent from the foregoing detailed description of one embodiment of the invention that no mechanical retaining means need be provided to hold the stationary seal ring 23 on its seat. The only surfaces on this ring which are subjected to the pressure of the fluid in the motor chamber 14 and which constitute piston faces tending to force the ring in one direction or the other are the oppositely facing surfaces 29 and 30. Inasmuch as the surface 29 is of greater area than the surface 30, the net effect of the fluid pressure acting on these surfaces is a small force urging the ring toward its seat. This relationship remains constant irrespective of the relative magnitude of the fluid pressures in the motor compartment 14 and in the seal compartment 18, respectively.

Although the invention has been shown as incorporated in a motor pump, it should be understood that this is solely for purposes of illustration, and that certain of the novel features are equally applicable to other instances of double sealing arrangements. It will also be evident that the invention may be embodied in other forms than that shown, without departing from the spirit of the invention or the scope of the appended claims.

I claim:

1. A double seal structure for sealing the junctures of a shaft with spaced walls of a chamber through which said shaft extends comprising, in combination: first and second mechanical seal units each comprising a non-rotating seal ring and a rotating seal ring, the non-rotating seal ring of the first seal unit being adapted to be fixedly mounted adjacent the shaft opening in one of said walls in fluid-tight relation thereto, the non-rotating seal ring of the second seal unit being adapted to be fixedly mounted adjacent the shaft opening of the other of said walls in fluid-tight relation thereto, the seal rings of each seal unit having mating sealing faces, said rotating seal rings being adapted to be slidably mounted on said shaft in fluid-tight relation thereto; and yieldable means urging each rotating seal ring into sealing engagement with its respective non-rotating seal ring, the radially inner portion of the sealing face of the non-rotating seal ring of the first seal unit being undercut to provide a radially extending pressure surface on the cooperating rotating seal ring exposed to the fluid pressure on the outer side of the said one wall, the effective pressure area of said pressure surface being greater than any pressure area on the rotating seal ring of the second seal unit exposed to the fluid pressure on the outer side of said other wall, whereby the rotating seal ring of the first seal unit is movable out of sealing engagement with its non-rotating seal ring responsive to a lower pressure differential than is required to move the rotating seal ring of the second seal unit out of sealing engagement with its non-rotating seal ring.

2. A double seal structure for sealing the junctures of a shaft with spaced walls of a chamber through which said shaft extends comprising, in combination: a first non-rotating seal ring adapted to be fixedly mounted in fluid-tight relation to one of said walls adjacent the shaft opening therein; a second non-rotating seal ring adapted to be fixedly mounted in fluid-tight relation to the other of said walls adjacent the shaft opening therein; first and second rotating seal rings adapted to be slidably mounted on said shaft in fluid-tight relation thereto; and means yieldably urging said first and second rotating seal rings into sealing engagement with said first and second non-rotating seal rings, respectively, said first rotating seal ring having a pressure surface exposed to the fluid pressure on the outer side of said one wall, the effective pressure area of said surface being greater than any pressure area on said second rotating seal ring exposed to the fluid pressure on the outer side of the other of said walls, whereby said first rotating seal ring is movable out of sealing engagement with said first non-rotating seal ring responsive to a lower pressure differential than is required to move said second rotating seal ring out of sealing engagement with said second non-rotating seal ring.

3. A double seal structure for sealing the junctures of a shaft with spaced walls of a chamber through which said shaft extends comprising, in combination: a first non-rotating seal ring adapted to be fixedly mounted in fluid-tight relation to one of said walls adjacent the shaft opening therein; a second non-rotating seal ring adapted to be fixedly mounted in fluid-tight relation to the other of said walls adjacent the shaft opening therein; first and second rotating seal rings adapted to be slidably mounted on said shaft in fluid-tight relation thereto; and means yieldably urging said first and second rotating seal rings into sealing engagement with said first and second non-rotating seal rings, respectively, said pairs of rotating and non-rotating seal rings having mating sealing faces, the radially inner portion of the sealing face of one of said first sealing rings being undercut to provide a pressure surface on said first rotating seal ring exposed to the fluid pressure on the outer side of said one wall, the effective pressure area of said surface being greater than any pressure area on said second rotating seal ring exposed to the fluid pressure on the outer side of the other of said walls, whereby said first rotating seal ring is movable out of sealing engagement with said first non-rotating seal ring responsive to a lower pressure differential than is required to move said second rotating seal ring out of sealing engagement with said second non-rotating seal ring.

CARL J. BLOM.

REFERENCES CITED

The following references are of record in the file of this patent:

UNITED STATES PATENTS

| Number | Name | Date |
| --- | --- | --- |
| Re. 22,353 | Karlberg | July 27, 1943 |
| 2,200,413 | Christman et al. | May 14, 1940 |
| 2,237,494 | McCormack | Apr. 8, 1941 |
| 2,365,046 | Bottomley | Dec. 12, 1944 |
| 2,395,705 | Wool | Feb. 26, 1946 |
| 2,418,194 | Piccaido | Apr. 1, 1947 |